(12) United States Patent
Simon

(10) Patent No.: US 10,670,111 B2
(45) Date of Patent: Jun. 2, 2020

(54) FLEXIBLE CABLE SUPPORT GRIPS FOR FLAT CABLES

(71) Applicant: HUBBELL INCORPORATED, Shelton, CT (US)

(72) Inventor: Robert James Simon, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/730,567

(22) Filed: Oct. 11, 2017

(65) Prior Publication Data
US 2018/0100559 A1 Apr. 12, 2018

Related U.S. Application Data

(60) Provisional application No. 62/406,484, filed on Oct. 11, 2016.

(51) Int. Cl.
| | | |
|---|---|---|
| F16G 11/00 | (2006.01) | |
| F16G 11/02 | (2006.01) | |
| F16L 3/10 | (2006.01) | |
| H02G 7/05 | (2006.01) | |
| F16G 11/04 | (2006.01) | |

(52) U.S. Cl.
CPC ............ *F16G 11/02* (2013.01); *F16L 3/1058* (2013.01); *H02G 7/053* (2013.01); *F16G 11/025* (2013.01); *F16G 11/048* (2013.01)

(58) Field of Classification Search
CPC ...... F16G 11/02; F16G 11/048; F16L 3/1058; G02B 6/4471; H02G 7/056; B66B 7/085; B66B 7/062

USPC ......... 248/63, 49, 58, 73; 385/136; 174/659; 24/136 R

See application file for complete search history.

(56) References Cited

U.S. PATENT DOCUMENTS

| | | | | |
|---|---|---|---|---|
| 2,524,649 A * | 10/1950 | Buhler | ............... | H01R 4/4872 |
| | | | | 24/115 G |
| 3,960,461 A | 6/1976 | Sachs | | |
| 4,939,821 A * | 7/1990 | Frank, Jr. | ............... | H02G 7/056 |
| | | | | 24/115 M |
| 5,142,745 A * | 9/1992 | Setty | ................. | F16G 11/02 |
| | | | | 24/115 M |
| 6,058,574 A * | 5/2000 | Facey | ................. | F16G 11/048 |
| | | | | 24/115 R |
| 6,581,251 B2 | 6/2003 | Malin | | |
| 7,367,534 B2 | 5/2008 | Franks | | |
| 8,517,317 B2 * | 8/2013 | Malin | ................. | F16G 11/02 |
| | | | | 174/40 CC |
| 10,206,729 B2 * | 2/2019 | Pratt | ................. | A61B 17/82 |

(Continued)

OTHER PUBLICATIONS

B Drop Wire Clamp; Allied Bolt Part # 903; Product Detail Sheet, Allied Bolt Products, LLC, The World's Leading Manufacturer of Outside Plant Hardware; Jul. 7, 2014, 3 pages.

(Continued)

*Primary Examiner* — Todd M Epps
(74) *Attorney, Agent, or Firm* — Ohlandt Greeley, Ruggiero & Perle, LLP

(57) ABSTRACT

A cable grip for a flat cable is provided. The cable grip includes a wire and a tapered wedge lock secured to the wire to define a closed eye. The tapered wedge lock forms a two-sided compression connection on the flat cable.

20 Claims, 5 Drawing Sheets

(56) References Cited

U.S. PATENT DOCUMENTS

2012/0273628 A1    11/2012  Malin
2013/0223808 A1*  8/2013  Harvey ................ G02B 6/4471
                                                                   385/136

OTHER PUBLICATIONS

International Search Report dated Dec. 22, 2017 from corresponding International PCT Application PCT/US2017/056202, 3 pages.
Written Opinion dated Dec. 22, 2017 from corresponding International PCT Application PCT/US2017/056202, 9 pages.
International Preliminary Report on Patentability dated Apr. 25, 2019 from corresponding International PCT Application PCT/US2017/056202, 7 pages.

* cited by examiner

FLEXIBLE CABLE SUPPORT GRIPS FOR FLAT CABLES

CROSS REFERENCE TO RELATED APPLICATION

This application claims the benefit of U.S. Application No. 62/406,484 filed on Oct. 11, 2016, the entire contents of which are incorporated herein by reference.

BACKGROUND

1. Field of the Invention

The present disclosure is related to cable support grips for flat cables. More particularly, the present disclosure is related to flexible cable support grips.

2. Description of Related Art

The aerial connection of cables such as, but not limited to, communication cables, data cables, power cables, and the like, from support structures including utility poles, buildings, communication antenna, and others is known. It is desired for the cable to be supported in a manner that lessens the potential for compromising the transmission through the cable. Thus, prior art various prior art support grips have been proposed for such applications.

One known prior art support grip for aerial support is shown in FIG. 1 and is generally referred to as a support grip 10. Grip 10 is used to secure a cable 12 from a support structure 14 such as a guide wire 16 or utility pole 18. Grip 10 supports the weight of cable 12 and maintains tension on the line, while relieving stress on the cable as shown at stress relieved region 20. Grip 10 is illustrated as a compression-type cable grip, in which the cable 12 is secured to the grip 10 through the application of a compressive force. Other prior art support grips are known to radially grip the cable, which have not proven useful for connection of flat cable systems.

Unfortunately, the prior art cable grips rigidly support the cable which hinders or prevents movement such as that caused by wind or that caused when the cable grip is used in static and/or movable applications.

Accordingly, it has been determined by the present disclosure that the prior art that there is a need for aerial cable support grips that are flexible and can be used with flat cables.

SUMMARY

A cable grip for a flat cable is provided. The cable grip includes a wire and a tapered wedge lock secured to the wire to define a closed eye. The tapered wedge lock forms a two-sided compression connection on the flat cable.

In some embodiments alone or in combination with any of the aforementioned and/or any of the after-mentioned embodiments, the tapered wedge lock can be directly or indirectly secured to the wire.

In some embodiments alone or in combination with any of the aforementioned and/or any of the after-mentioned embodiments, the tapered wedge lock includes a plurality of tapered wedge locks that are directly and/or indirectly secured to the wire.

In some embodiments alone or in combination with any of the aforementioned and/or any of the after-mentioned embodiments, the tapered wedge lock includes a compression wedge and a compression jacket.

In some embodiments alone or in combination with any of the aforementioned and/or any of the after-mentioned embodiments, the tapered wedge lock and/or the compression jacket further include a connection device that prevent inadvertent withdrawal of the tapered wedge lock and/or the compression jacket.

In some embodiments alone or in combination with any of the aforementioned and/or any of the after-mentioned embodiments, the tapered wedge lock includes a primary lock that is directly secured to the wire.

In some embodiments alone or in combination with any of the aforementioned and/or any of the after-mentioned embodiments, the cable grip further includes a secondary lock that is secured to the primary lock by an interlocking feature so that the secondary lock is indirectly secured to the wire.

In some embodiments alone or in combination with any of the aforementioned and/or any of the after-mentioned embodiments, the interlocking feature secures the primary and secondary locks to one another so as to provide a hinge-like movement between the primary and secondary locks.

In some embodiments alone or in combination with any of the aforementioned and/or any of the after-mentioned embodiments, the tapered wedge lock includes a plurality of tapered wedge locks that are each directly secured to the wire.

In some embodiments alone or in combination with any of the aforementioned and/or any of the after-mentioned embodiments, the wire is flexible.

In some embodiments alone or in combination with any of the aforementioned and/or any of the after-mentioned embodiments, the tapered wedge lock is permanently secured to the wire.

In some embodiments alone or in combination with any of the aforementioned and/or any of the after-mentioned embodiments, the tapered wedge lock is permanently secured to the wire by one or more crimps.

In some embodiments alone or in combination with any of the aforementioned and/or any of the after-mentioned embodiments, the tapered wedge lock is removably secured to the wire so that the closed eye can be selectively opened and closed.

In some embodiments alone or in combination with any of the aforementioned and/or any of the after-mentioned embodiments, the cable grip further includes a sleeve on the wire at the closed eye. The sleeve protects the wire and/or distributes forces onto the wire from a support structure.

In some embodiments alone or in combination with any of the aforementioned and/or any of the after-mentioned embodiments, the cable grip further includes a knurled surface positioned to mate with and increase frictional engagement with the flat cable.

A cable grip for a flat cable is also provided that includes a flexible wire and a first tapered wedge lock directly secured to the flexible wire to define a closed eye. The first tapered wedge lock receives a compression wedge. The first tapered wedge lock and the compression wedge each have a flat surface that form a two-sided compression connection on the flat cable.

In some embodiments alone or in combination with any of the aforementioned and/or any of the after-mentioned embodiments, the cable grip further includes a second tapered wedge lock. The second tapered wedge lock is directly secured to the wire or directly secured to the first tapered wedge lock.

In some embodiments alone or in combination with any of the aforementioned and/or any of the after-mentioned embodiments, the cable grip further includes a second tapered wedge lock secured to the first tapered wedge lock so as to provide a hinge-like movement between the first and second tapered wedge locks.

In some embodiments alone or in combination with any of the aforementioned and/or any of the after-mentioned embodiments, the first tapered wedge lock is permanently secured to the wire by one or more crimps.

In some embodiments alone or in combination with any of the aforementioned and/or any of the after-mentioned embodiments, the first tapered wedge lock removably secured to the wire so that the closed eye can be selectively opened and closed.

The above-described and other features and advantages of the present disclosure will be appreciated and understood by those skilled in the art from the following detailed description, drawings, and appended claims.

DETAILED DESCRIPTION

Figure 2:
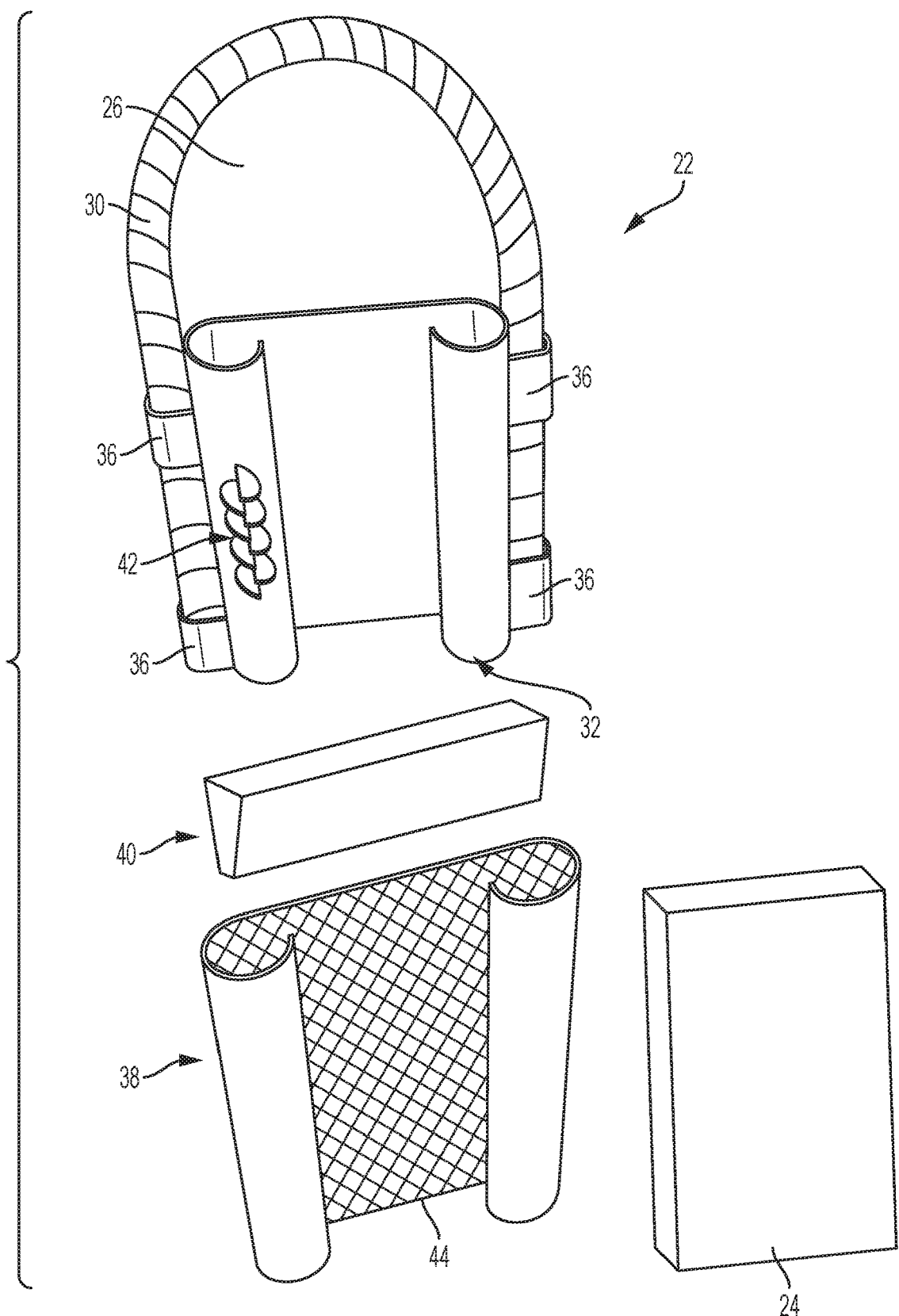
FIG. 2 is an exploded view of an exemplary embodiment of a cable support grip according to the present disclosure.

Referring to the drawings and in particular to FIG. 2, an exemplary embodiment of a cable support grip according to the present disclosure is shown and is generally referred to by reference numeral 22.

Grip 22 is advantageously configured as a compression-type cable grip for use with a flat cable 24 such as, but not limited to, multi-service cables, festooning cables, and others. Grip 22 finds use in both static and dynamic cable applications such as, but not limited to, machine tool applications, hoist applications, crane applications, elevator applications, lift applications, and others.

Figure 1:
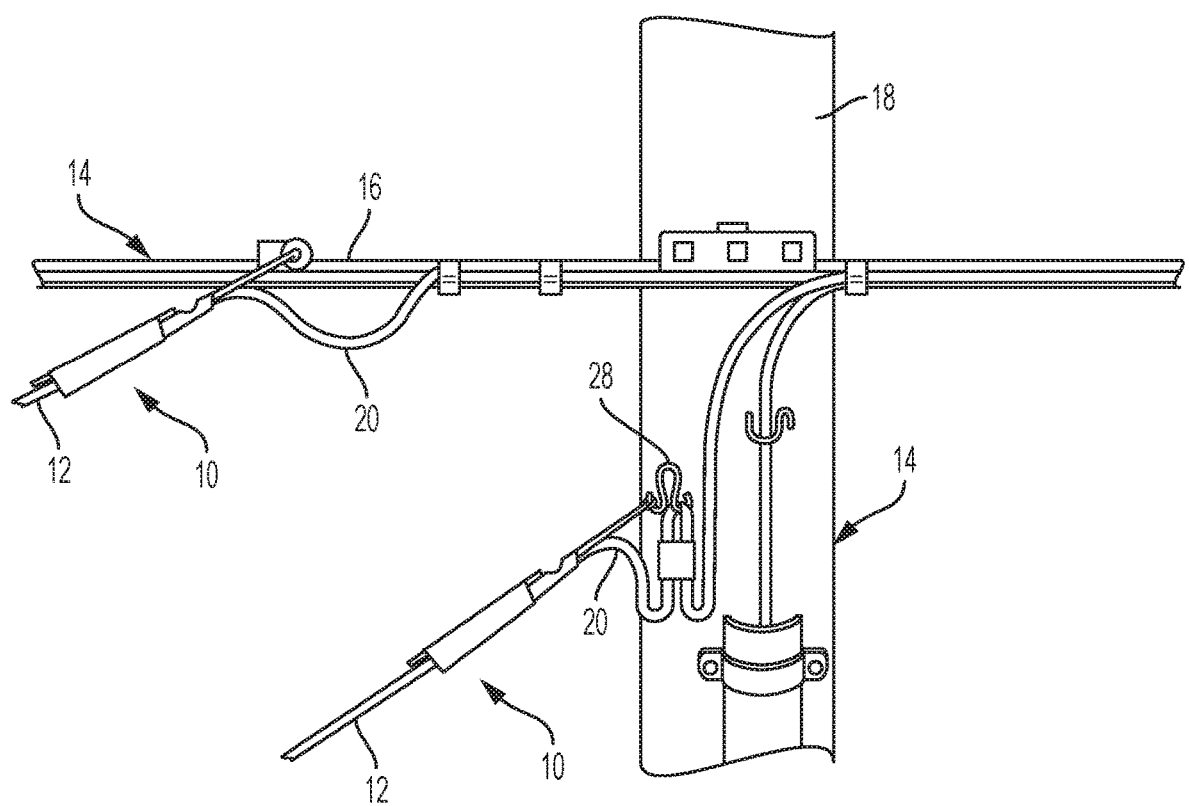
FIG. 1 is a typical installation of a prior art cable support grip installation.

Grip 22 can include an eye 26 that can be connected to the support structure in a known manner. For example, eye 26 can be secured to a hook 28 (FIG. 1) of the support structure. In the illustrated embodiment, eye 26 is formed by a loop of wire 30, forming the closed eye. It should be recognized that the support structure is illustrated in FIG. 1 as a stationary utility pole. However, grip 22 of the present disclosure is particularly suited for use with mobile support structures such elevators, lifts, and others. Here, grip 22 is configured to secure one or more flat cables 24 to the mobile support structure in a flexible manner.

Grip 22 further includes a tapered wedge lock 32. Tapered wedge lock 32 is secured to wire 30 to define the closed eye 26. Wire 30 can be a wire rope made from those that commercially available such as, but not limited to, spiral strand ropes and fully locked coil ropes.

In some embodiments, lock 32 is non-removably or permanently fixed to wire 30 by one or more crimps 36. In other embodiments, lock 32 can be at least partially removably attached to wire 30 so that eye 26 can be selectively opened and closed as desired.

Tapered wedge lock 32 receives a compression jacket 38 with a compression wedge 40 therebetween. Lock 32 and/or jacket 38 can, in some embodiments, include a connection device 42, which is illustrated in FIG. 2 as ratchet teeth on the lock. Connection device 42 can be configured to prevent inadvertent withdrawal of lock 32 and/or jacket 38 from one another.

In use, the cable 24 is compressed by wedge 40 between lock 32 and/or jacket 38 to secure flat cable 24 in grip 22. It is believed by the present disclosure that the flat surfaces of lock 32, jacket 38, and wedge 40 make grip 22 particularly suited for use with flat cable 24—namely cables with a non-round cross section. Simply stated, grip 22 forms a two-sided compression connection on the cable, which is particularly well suited for connection to cables with non-round cross sections.

Jacket 38 can include a knurled surface 44 that mates with and increases the frictional engagement with the cable. Of course, it is contemplated for knurled surface 44 to be present on one or more of lock 32, jacket 38, and wedge 40 or any combinations thereof.

Without wishing to be bound by any particular theory, grip 22 having wire 30 provides for easy of assembly, reduces costs, ease of manufacture, and provides for adaptability in design that have not previously been possible from the prior art. Moreover, grip 22 having wire 30 also imparts a degree-of-freedom or flexibility to grip 22, which is believed to assist in assembly and connection with the support structure that is not possible from the rigid assemblies of the prior art.

Figure 3:
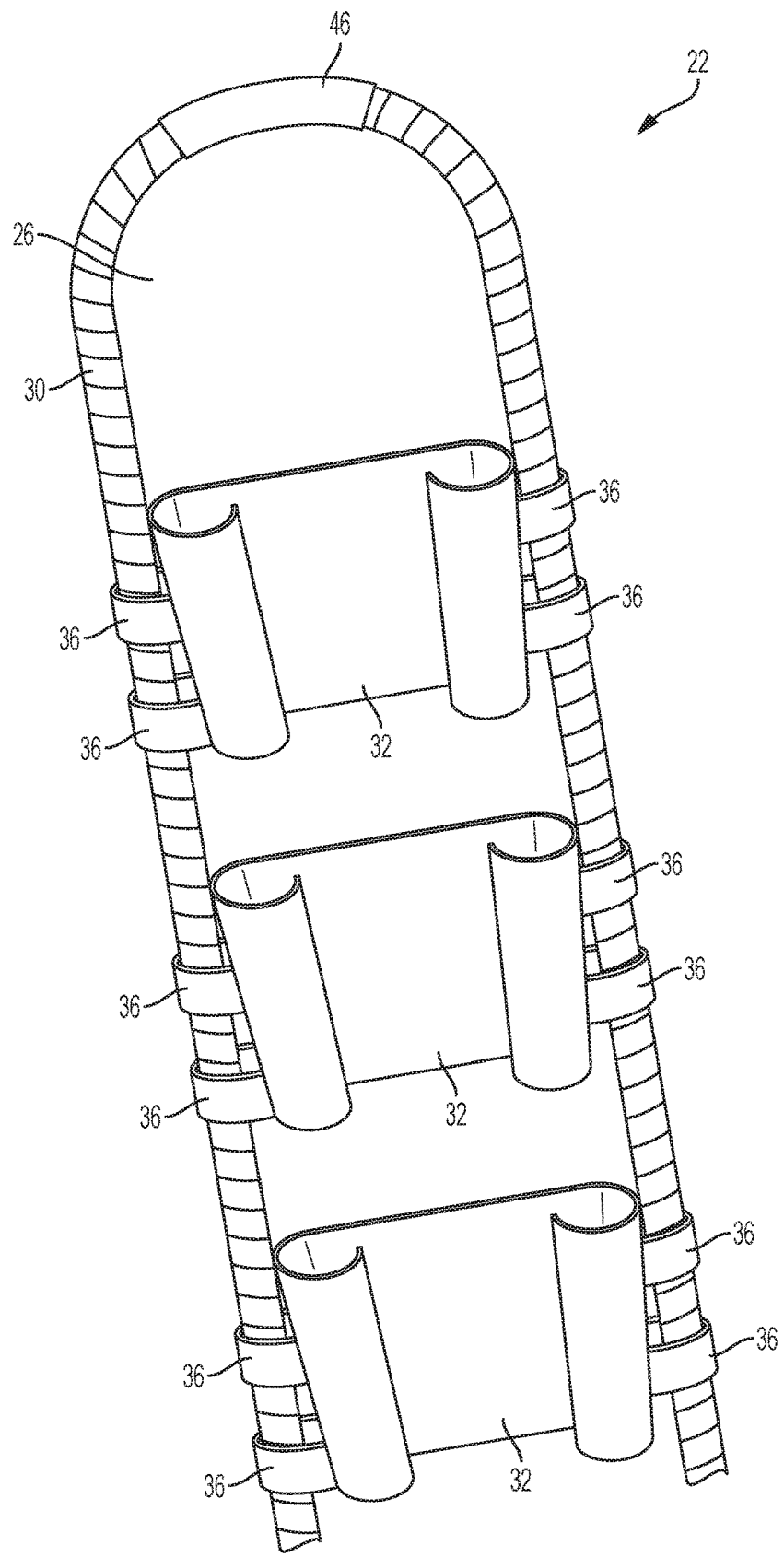
FIG. 3 illustrates an exemplary embodiment of the cable support grip of FIG. 2.
Figure 4:
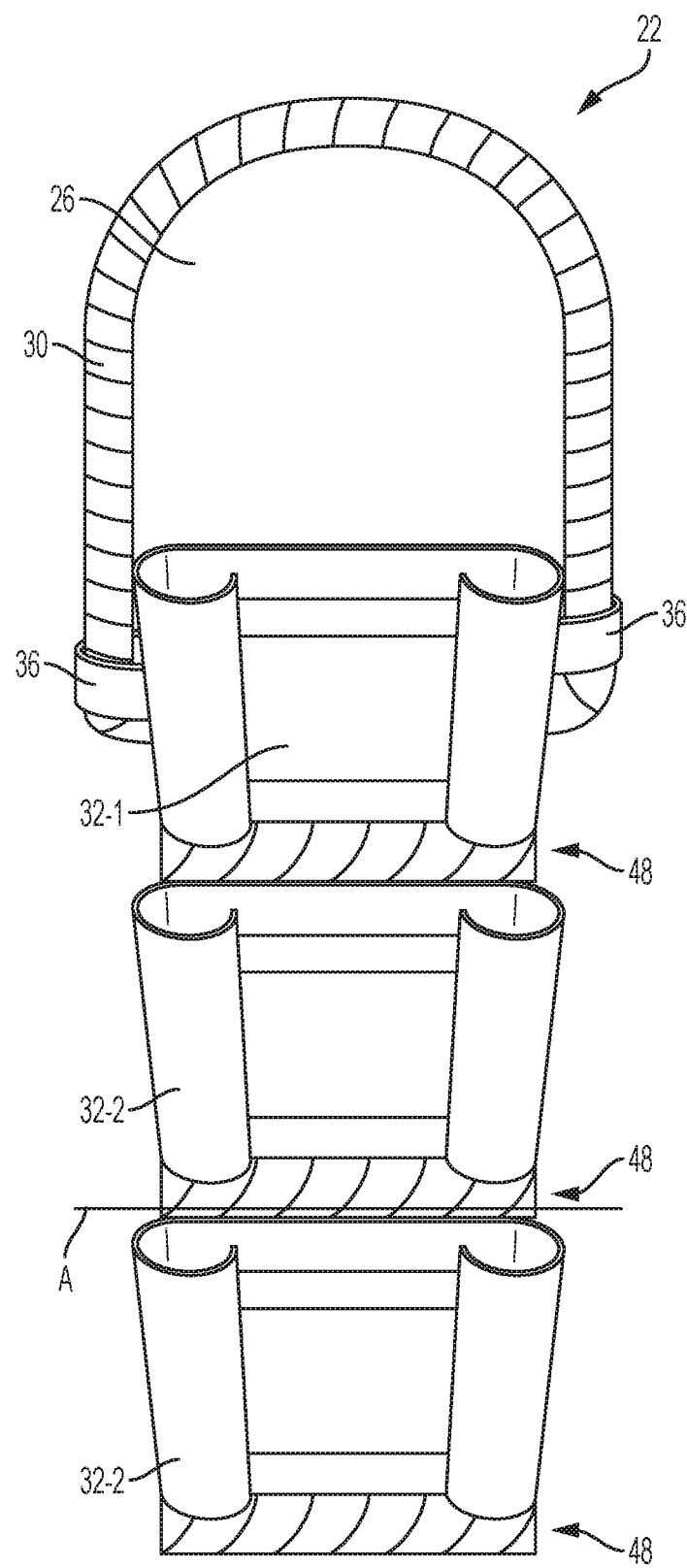
FIG. 4 illustrates another exemplary embodiment of the cable support grip of FIG. 2.
Figure 5:
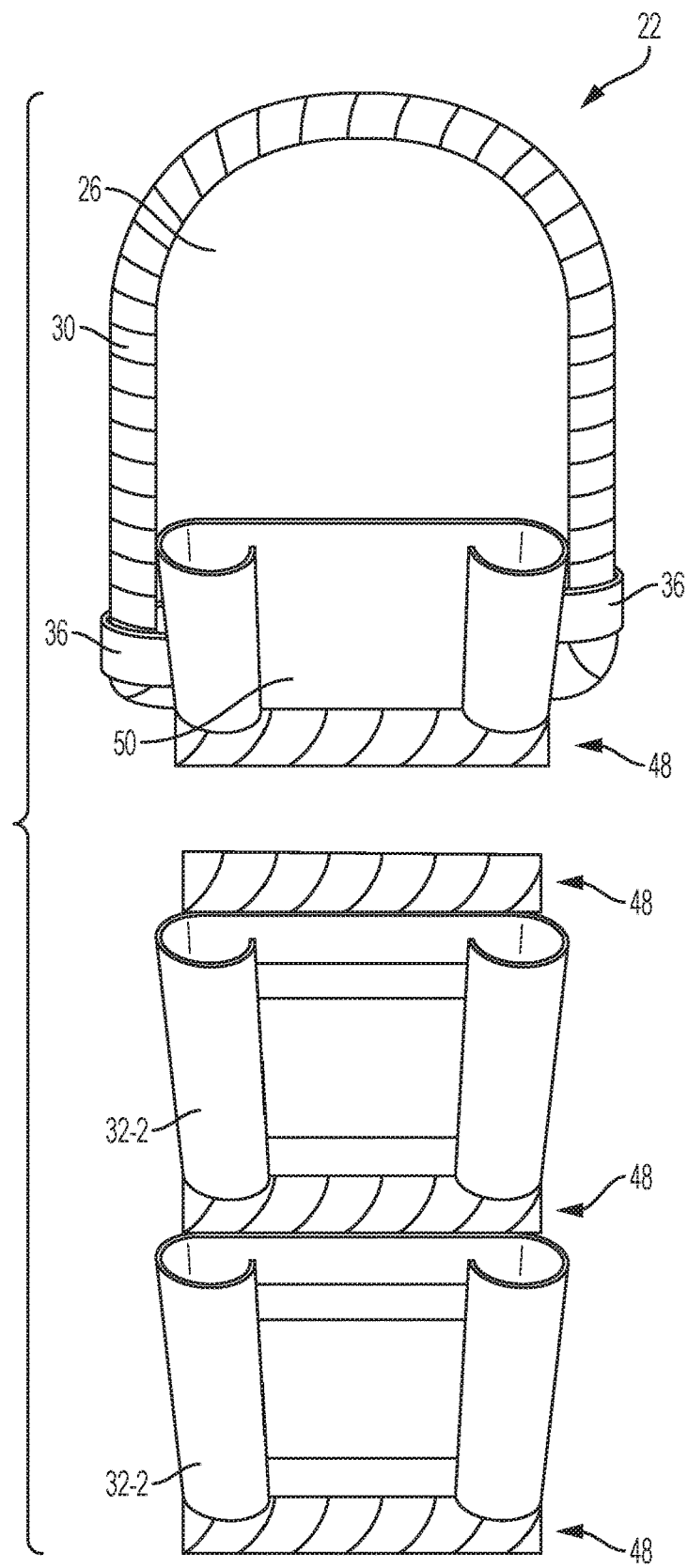
FIG. 5 illustrates another exemplary embodiment of the cable support grip of FIG. 2.

Referring now FIGS. 3-5, grip 22 of the present disclosure can be advantageously configured to have more than one lock 32 secured to wire 30.

In the embodiment of FIG. 3, grip 22 is shown having three locks 32 secured by crimps 36 directly to wire 30. In this manner, grip 22 can be configured to secure multiple cables to the support structure.

Also shown in the embodiment of FIG. 3, grip 22 can include a sleeve 46 on wire 30 at eye 26. Sleeve 46 can be configured to protect wire 30 and/or distribute forces from the support structure (e.g., hook 28) onto the wire.

In the embodiment of FIG. 4, grip 22 is shown having a primary lock 32-1 secured by crimps 36 directly to wire 30 and one or more secondary locks 32-2 (two shown) serially secured to the primary lock. Preferably, secondary locks 32-2 are secured to primary lock 32-1 and to one another by interlocking features 48. Features 48 can be permanently affix locks 32-1, 38-2 to one another at the time of manufacture. Alternately, features 48 can be configured to allow locks 32-1, 22-2 to be secured to one another in the field by, for example, a crimp or threaded connection. In this manner, grip 22 can provide the user the ability to customize the grip for any desired number of cables.

In some embodiments, features 48 can be configured to allow rotation about an axis A when secured to one another, providing a hinge-like movement between the locks. In this manner, the individual locks 32-1, 32-2, even when secured to one another, impart a degree-of-freedom or flexibility to grip 22, which is believed to assist in assembly and connection with the support structure that is not possible from the rigid assemblies of the prior art.

In the embodiment of FIG. 5, grip 22 is shown having a base member 50 secured by crimps 36 directly to wire 30. Base member 50 includes feature 48 that mates with the corresponding features 48 of secondary locks 32-2. In this manner, grip 22 is configured to allow any number or size of locks 32-2 to be secured to base member 50 either permanently at the time of manufacture and/or in the field as needed.

Simply stated, grip 22 can be configured so that one or more locks 32 are directly and/or indirectly secured to wire 30 either permanently or removably in a flexible and adaptable manner. Accordingly, grip 22 is advantageously configured to secure any desired number of flat cables to the support structure.

The various components of grip 22 can be formed of any material sufficient to withstand the outdoor elements such as, but not limited, to aluminum, steel, cast iron, and others.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST support grip 10
cable 12
support structure 14
guide wire 16
utility pole 18
stress relieved region 20
cable support grip 22
flat cable 24
eye 26
hook 28
wire 30
tapered wedge lock 32
crimps 36
compression jacket 38
compression wedge 40
connection device 42
knurled surface 44
sleeve 46
primary lock 32-1
secondary lock 32-2
interlocking features 48
axis A
base member 50

What is claimed is:

1. A cable grip for a flat cable, comprising:
   a wire;
   a tapered wedge lock secured to the wire to define a closed eye, the tapered wedge lock having a compression jacket received therein so as to form a two-sided compression connection on the flat cable between the tapered wedge lock and the compression jacket; and
   a second tapered wedge lock secured to the wire spaced from the tapered wedge lock.

2. The cable grip of claim 1, wherein the tapered wedge lock is directly or indirectly secured to the wire.

3. The cable grip of claim 1, wherein the second tapered wedge lock is directly and/or indirectly secured to the wire.

4. The cable grip of claim 1, wherein the tapered wedge lock further comprises a compression wedge.

5. The cable grip of claim 4, wherein the tapered wedge lock and/or the compression jacket further comprise a connection device configured to prevent inadvertent withdrawal of the compression wedge and/or the compression jacket.

6. The cable grip of claim 1, wherein the tapered wedge lock comprises a primary lock that is directly secured to the wire.

7. The cable grip of claim 1, wherein the tapered wedge lock and the second tapered wedge lock are each directly secured to the wire.

8. The cable grip of claim 1, wherein the wire is flexible.

9. The cable grip of claim 1, wherein the tapered wedge lock is permanently secured to the wire.

10. The cable grip of claim 9, wherein the tapered wedge lock is permanently secured to the wire by one or more crimps.

11. The cable grip of claim 1, wherein the tapered wedge lock is removably secured to the wire so that the closed eye can be selectively opened and closed.

12. The cable grip of claim 1, further comprising a sleeve on the wire at the closed eye, the sleeve being configured to protect the wire and/or distribute forces onto the wire from a support structure.

13. The cable grip of claim 1, further comprising a knurled surface positioned to mate with and increase frictional engagement with the flat cable.

14. A cable grip for a flat cable, comprising a wire and a tapered wedge lock secured to the wire to define a closed eye, the tapered wedge lock forming a two-sided compression connection on the flat cable, wherein the tapered wedge lock comprises a primary lock that is directly secured to the wire, and further comprising a secondary lock that is secured to the primary lock by an interlocking feature so that the secondary lock is indirectly secured to the wire.

15. The cable grip of claim 14, wherein the interlocking feature secures the primary and secondary locks to one another so as to provide a hinge-like movement between the primary and secondary locks.

16. A cable grip for a flat cable, comprising:
   a flexible wire;
   a first tapered wedge lock directly secured to the flexible wire to define a closed eye, the first tapered wedge lock receiving a compression wedge, the first tapered wedge lock and the compression wedge each having a flat surface that form a two-sided compression connection on the flat cable; and
   a second tapered wedge lock secured to the flexible wire spaced from the first tapered wedge lock.

17. The cable grip of claim 16, wherein the second tapered wedge lock is directly secured to the wire or directly secured to the first tapered wedge lock.

18. The cable grip of claim 16, wherein the first tapered wedge lock is permanently secured to the wire by one or more crimps.

19. The cable grip of claim 16, wherein the first tapered wedge lock removably secured to the wire so that the closed eye can be selectively opened and closed.

20. A cable grip for a flat cable, comprising:
   a flexible wire;
   a first tapered wedge lock directly secured to the flexible wire to define a closed eye, the first tapered wedge lock receiving a compression wedge, the first tapered wedge lock and the compression wedge each having a flat surface that form a two-sided compression connection on the flat cable; and a second tapered wedge lock secured to the first tapered wedge lock so as to provide a hinge-like movement between the first and second tapered wedge locks.

\* \* \* \* \*